US007760764B2

(12) United States Patent
Ahn et al.

(10) Patent No.: US 7,760,764 B2
(45) Date of Patent: Jul. 20, 2010

(54) DIGITAL BROADCAST RECEIVING APPARATUS AND METHOD OF REDUCING OUTPUT TIME OF BROADCAST CONTENT

(75) Inventors: Young-joon Ahn, Gyeonggi-do (KR); Cheol-Ju Hwang, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 783 days.

(21) Appl. No.: 11/604,861

(22) Filed: Nov. 28, 2006

(65) Prior Publication Data

US 2007/0268935 A1 Nov. 22, 2007

(30) Foreign Application Priority Data

May 19, 2006 (KR) ...................... 10-2006-0045113

(51) Int. Cl.
*H04J 1/00* (2006.01)

(52) U.S. Cl. ...................... 370/486; 370/522; 370/535; 348/469

(58) Field of Classification Search ................. 370/466, 370/522, 535, 486, 338; 348/469
See application file for complete search history.

(56) References Cited

U.S. PATENT DOCUMENTS

| | | | | |
|---|---|---|---|---|
| 6,285,824 | B1 * | 9/2001 | Yanagihara et al. | 386/98 |
| 6,986,159 | B1 | 1/2006 | Shimoji et al. | |
| 7,340,541 | B2 * | 3/2008 | Castro et al. | 710/31 |
| 7,555,000 | B2 | 6/2009 | Shimoji et al. | |
| 2004/0057457 | A1 * | 3/2004 | Ahn et al. | 370/466 |
| 2005/0055714 | A1 | 3/2005 | Lee | |
| 2006/0002431 | A1 * | 1/2006 | Seo et al. | 370/522 |
| 2007/0040937 | A1 * | 2/2007 | Eum | 348/469 |

FOREIGN PATENT DOCUMENTS

| | | |
|---|---|---|
| CN | 1251965 | 5/2000 |
| CN | 1578422 | 2/2005 |

OTHER PUBLICATIONS

Office Action issued by the State Intellectual Property Office in Chinese Patent Application No. 2007100061255 on May 22, 2009.

* cited by examiner

*Primary Examiner*—Ricky Ngo
*Assistant Examiner*—David Oveissi
(74) *Attorney, Agent, or Firm*—Staas & Halsey LLP

(57) ABSTRACT

A digital broadcast receiving apparatus and method of reducing an output time of broadcast content, includes for the apparatus, a transport stream generator generating a transport stream from a digital broadcast signal, a transport stream buffer buffering the transport stream, a controller determining whether the buffered transport stream is reliable; a transport stream processor searching for interpretation information for interpreting broadcast content from the buffered transport stream, and searching for the broadcast content based on the interpretation information, if the buffered transport stream is determined as reliable, and an audio and video processor processing the searched broadcast content. Therefore, it is possible to quickly output and provide broadcast content to users.

36 Claims, 7 Drawing Sheets

FIG. 4

| Syntax | No. of bits | Mnemonic |
|---|---|---|
| program_association_section( ) { | | |
| table_id | 8 | uimsbf |
| section_syntax_indicator | 1 | bslbf |
| '0' | 1 | bslbf |
| reserved | 2 | bslbf |
| section_length | 12 | uimsbf |
| transport_steram_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| for (i=0;i<N;i++) { | | |
| program_number | 16 | uimsbf |
| reserved | 3 | bslbf |
| if(program_number=='0') { | | |
| network_PID | 13 | uimsbf |
| } | | |
| else { | | |
| program_map_PID | 13 | uimsbf |
| } | | |
| } | | |
| CRC_32 | 32 | rpchof |
| } | | |

FIG. 5

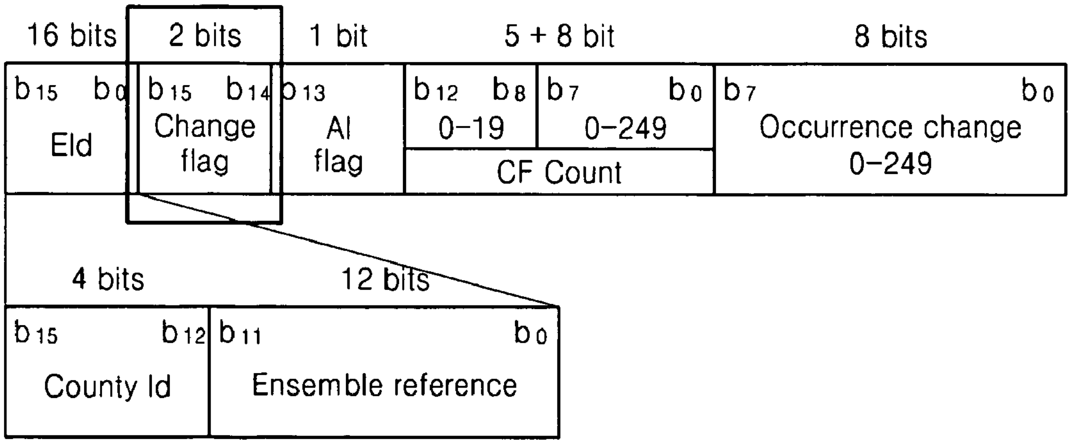

DIGITAL BROADCAST RECEIVING APPARATUS AND METHOD OF REDUCING OUTPUT TIME OF BROADCAST CONTENT

CROSS-REFERENCE TO RELATED APPLICATION

This application claims the benefit of Korean Application No. 2006-45113, filed May 19, 2006 in the Korean Intellectual Property Office, the disclosure of which is incorporated herein by reference.

BACKGROUND OF THE INVENTION

1. Field of the Invention

Aspects of the present invention relate to a digital broadcast receiving apparatus and method, and more particularly, to a digital broadcast receiving apparatus and method that quickly outputs digital broadcast contents.

2. Description of the Related Art

Digital broadcasting systems can be implemented using various standards, such as the Korean Digital Multimedia Broadcasting (DMB) standard, the European Digital Video Broadcasting (DVB) standard, the Chinese Digital Media Broadcasting Terrestrial (DMB-T) standard, etc. Among the various digital broadcasting standards, only the DMB system will be described as an example for sake of convenience.

Digital Multimedia Broadcasting (DMB) refers to a multimedia broadcast that is capable of superior sound quality and multi-channel audio services, to video services that are not disconnected even during high-speed movements, and to a variety of data services such as broadcasting information, news, traffic and transportation information, etc. through an integrated terminal at home, in a vehicle, and in outdoor environments.

The DMB system is a multimedia broadcasting system in which a European Digital Audio Broadcasting (DAB) system is combined with a video service. The DAB system has been designed to digitize existing AM and FM radio broadcasting and to provide audio and data services. The DAB system is referred to as "EUREKA 147 DAB.".

Compared to broadcasting through analog television, DAB requires more time to change broadcast channels and to receive the DAB through the changed DAB broadcast channel. In more detail, when a DAB broadcast channel is changed by a user, the user receives the DAB only after 1) the broadcast signals are stably received through the changed DAB broadcast channel over a predetermined time and are processed to generate a transport stream, 2) the transport stream is processed to generate video and/or audio data, and 3) the video and/or audio data are buffered. These processes require processing time and delay the output of the video and/or audio data. Therefore, a way is needed to quickly provide digital broadcasts to users utilizing digital broadcasting technology.

SUMMARY OF THE INVENTION

Aspects of the present invention provide a digital broadcast receiving apparatus and method to quickly output and provide digital broadcast content to users.

According to an aspect of the present invention, a digital broadcast receiving apparatus includes a transport stream generator to generate a transport stream from a digital broadcast signal; a transport stream buffer to buffer the transport stream; a controller to determine whether the buffered transport stream is reliable; a transport stream processor to search for interpretation information for interpreting broadcast content from the buffered transport stream, and to search for the broadcast content based on the interpretation information, if the buffered transport stream is determined as reliable; and an audio and video processor to process the searched broadcast content.

The controller determines whether the buffered transport stream is reliable according to whether a characteristic of the transport stream has changed.

The interpretation information for interpreting the broadcast content includes a Program Association Table (PAT), a Program Map Table (PMT), and an Object Descriptor (OD).

The transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

The controller determines whether the buffered transport stream is reliable based on information indicating whether a broadcast service has changed.

The transport stream generator interprets the information indicating whether the broadcast service has changed from the digital broadcasting signal and transfers the interpreted information to the controller, and the information indicating whether the broadcast service has changed is a change flag included in a FIG 0/0 (Extension 0 of FIG type 0) and which indicates whether a subchannel configuration and/or service configuration has changed.

The transport stream processor interprets indicators respectively included in a Program Association Table (PAT), a Program Map Table (PMT), and/or an Object Descriptor (OD) that indicate whether the PAT, the PMT, and/or the OD can be currently used or must be used next time, respectively, and transfers the interpreted result to the controller, and the controller determines whether the buffered transport stream is reliable based on the interpreted result.

If the buffered transport stream is determined as not reliable, the controller controls the transport stream processor so that the buffered transport stream is not used.

If the buffered transport stream is determined as not reliable, the controller controls the transport stream buffer so that the transport stream is no longer buffered.

According to another aspect of the present invention, a method of receiving digital broadcast includes: generating a transport stream from a digital broadcast signal; buffering the transport stream; determining whether the buffered transport stream is reliable; searching for interpretation information for interpreting broadcast content from the buffered transport stream if the buffered transport stream is determined as reliable; searching for the broadcast content based on the interpretation information; and processing the searched broadcast content.

According to an aspect of the present invention, a method of generating digital multimedia data from a digital broadcast signal includes: buffering a transport stream generated from the digital broadcast signal; detecting an indicator that indicates whether the digital multimedia data may be output using the transport stream during the buffering of the transport stream; and outputting the digital multimedia data during the buffering of the transport stream based on the detected indicator.

According to an aspect of the present invention, a digital broadcast receiving apparatus to generate digital multimedia data from a digital broadcast signal includes: a transport stream buffer to buffer a transport stream generated from the digital broadcast signal; a controller to detect an indicator that indicates whether the digital multimedia data may be output using the transport stream during the buffering of the transport stream; and a digital multimedia data processor to output the digital multimedia data during the buffering of the transport stream based on the detected result.

According to an aspect of the present invention, a method of generating digital multimedia data from a digital broadcast signal using a plurality of predetermined information includes: generating a transport stream from the digital broadcast signal, wherein the transport stream contains the plurality of predetermined information; detecting at least one of the plurality of predetermined information and extracting an indicator from the one predetermined information; and outputting the digital multimedia data if the detected indicator indicates that the digital multimedia data may be output prior to detecting the other of the plurality of predetermined information.

According to an aspect of the present invention, a digital broadcast receiving apparatus to generate digital multimedia data from a digital broadcast signal, includes: a transport stream generator to generate a transport stream from the digital broadcast signal, wherein the transport stream contains the plurality of predetermined information; a transport stream processor to detect at least one of the plurality of predetermined information and to extract an indicator from the one predetermined information; and a digital multimedia data processor to output the digital multimedia data prior to the detection of the other of the plurality of predetermined information by the transport stream processor if the detected indicator indicates that the digital multimedia data may be output.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 4 illustrates an indicator included in a Program Association Table (PAT), according to an aspect of the present invention;

FIG. 5 is a view illustrating a structure of an “Ensemble” information field including a change flag, according to an aspect of the present invention;

DETAILED DESCRIPTION OF THE EMBODIMENTS

Figure 1:
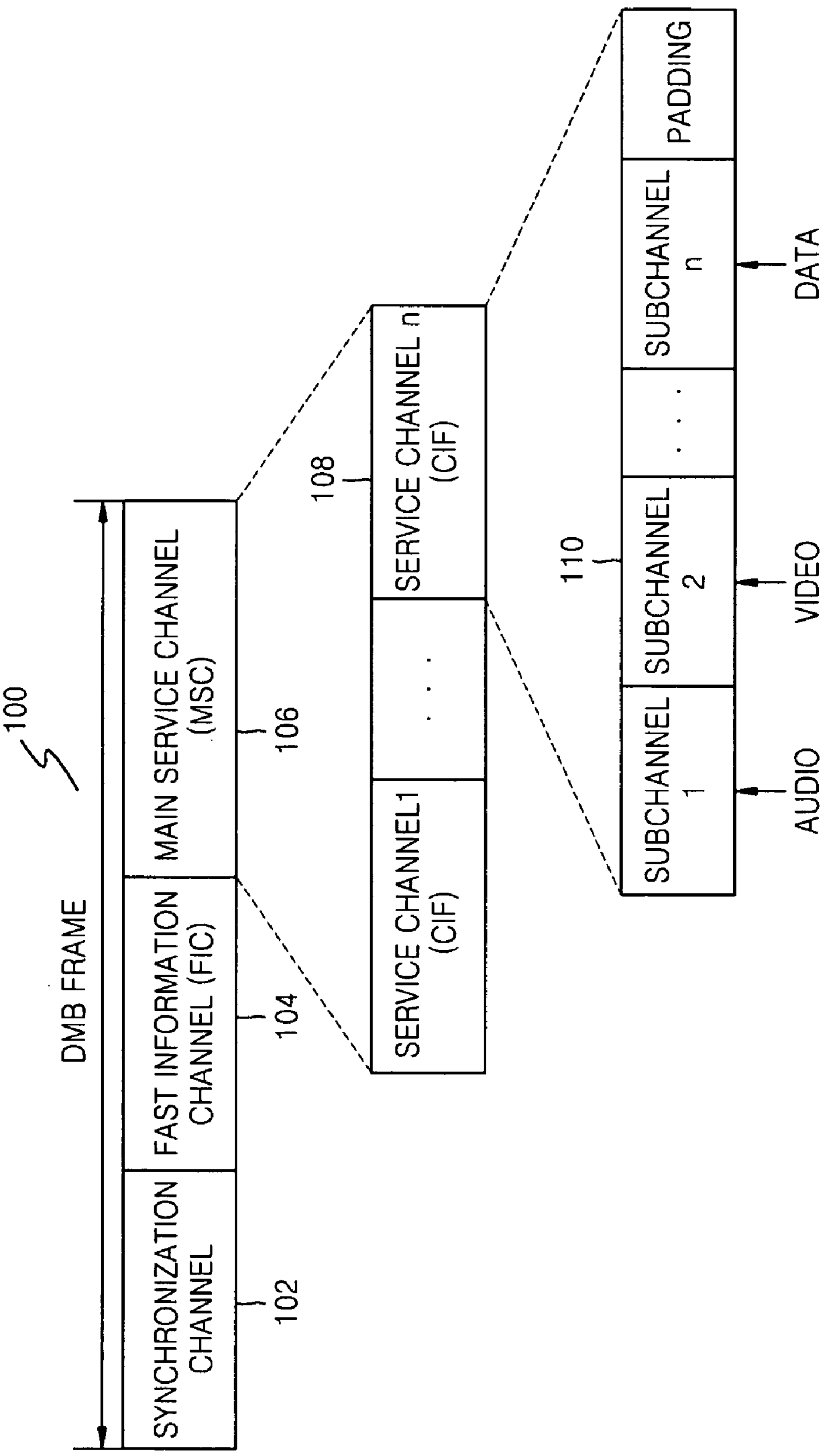
FIG. 1 is a view illustrating a frame structure of a Digital Multimedia Broadcasting (DMB) system according to an aspect of the present invention.

Reference will now be made in detail to the aspects of the present invention, examples of which are illustrated in the accompanying drawings, wherein like reference numerals refer to the like elements throughout. The aspects are described below in order to explain the present invention by referring to the figures.

FIG. 1 is a view illustrating a Digital Multimedia Broadcasting (DMB) frame 100 of a Digital Multimedia Broadcasting (DMB) system according to an aspect of the present invention. Referring to FIG. 1, the DMB frame 100 includes a synchronization channel 102, a fast information channel (FIC) 104, and a main service channel (MSC) 106.

The synchronization channel 102 contains information to synchronize the DMB frame 100 when the DMB frame 100 is demodulated. The FIC 104 contains a variety of control information, urgent data requiring fast transmission, and service information. The signals of the FIC 104 can be quickly transmitted because the signals of the FIC 104 do not pass through a time interleaver as do the signals of the MSC 106. However, the signals of the FIC 104 have a limited transmission capacity of 32 bytes.

As shown, the MSC 106 contains data of a plurality of audio services, a plurality of video services, and a plurality of data services. As illustrated in FIG. 1, the DMB frame 100 includes a plurality of service channels 108 (1 through n) and each of the service channels 108 includes a plurality of subchannels 110 (and/or paddings).

The respective subchannels 110 may contain audio, video and/or data and are independently subjected to encoding and interleaving. Accordingly, the respective subchannels 110 are multiplexed to the MSC 106. Meanwhile, each of the subchannels 110 includes an MPEG-2-based transport stream to which data for an audio service, data for a video service, and data for a data service are packetized. That is; the transport stream constituting each subchannel 110 includes a video stream, an audio stream, and/or additional data, etc.

Figure 2:
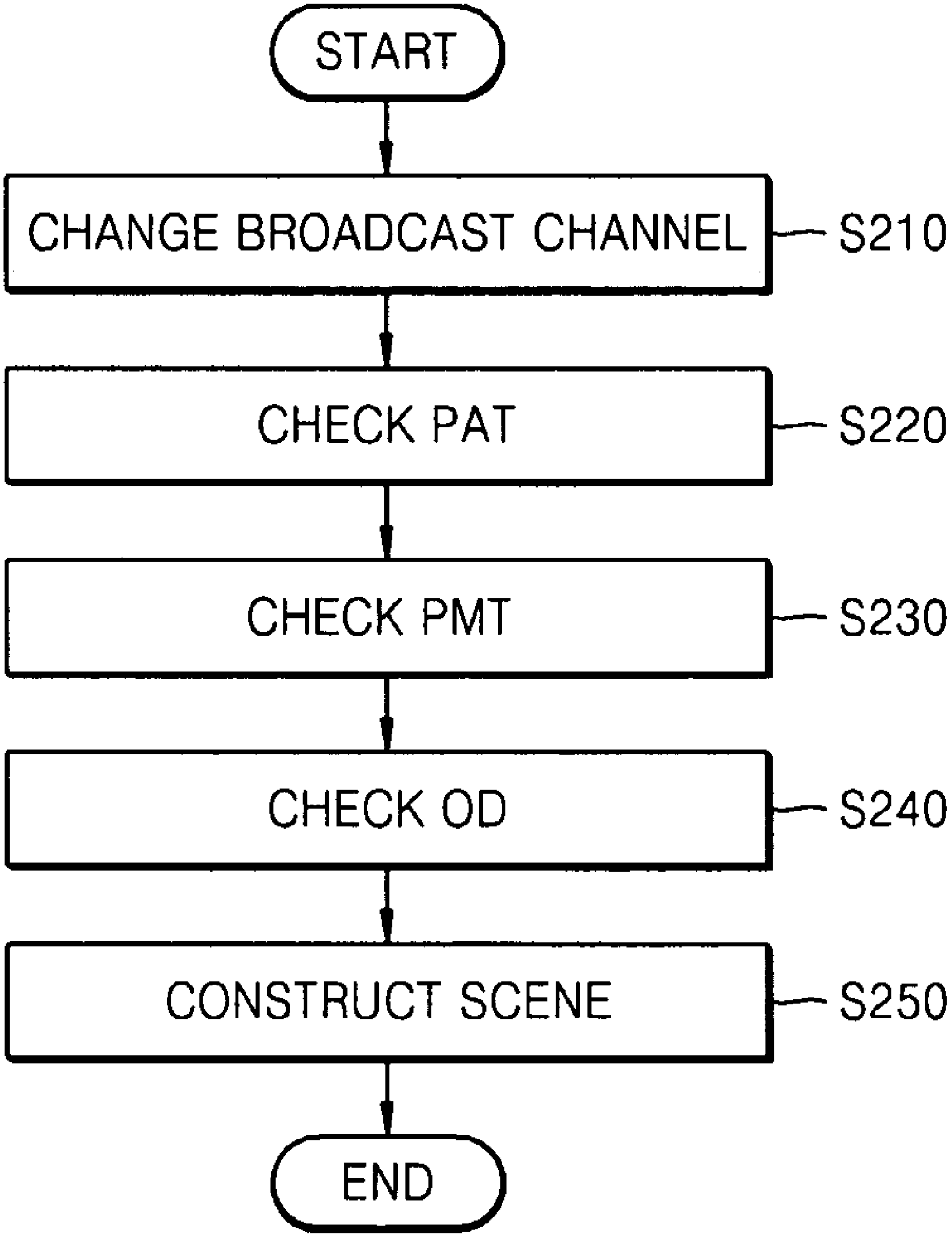
FIG. 2 is a flowchart schematically illustrating a process in which broadcast content is output from a transport stream when a DMB is received.

FIG. 2 is a flowchart schematically illustrating a process in which broadcasting content is output from a transport stream when a DMB is received. Referring to FIG. 2, when a user begins to operate a digital broadcast terminal or changes a broadcast channel (operation S210), the digital broadcast terminal performs demodulation, channel decoding, and/or error correction of a received digital broadcast signal. The digital broadcast terminal generates a transport stream based on the MPEG-2 standard. Then, from the transport stream, the digital broadcast terminal checks (e.g., searches, identifies, extracts, and/or acquires) a program association table (PAT) whose program identifier (PID) contains an indicator of 0, for example (operation S220). Then, the digital broadcast terminal searches (e.g., checks, identifies, extracts, and/or acquires, etc.) for a program included in the PAT, and for a PID of a program map table (PMT) that corresponds to the program. In a non-limiting aspect of the present invention, only one PMT exists in the PAT. The PMT is searched using the PID of the PMT (operation S230). Subsequently, an Initial Object Descriptor (IOD) is extracted (e.g., checked, searched, identified, and/or acquired, etc.) from the PMT. An Elementary Stream (ES)_descriptor, ES_ID, and ES_information are sequentially extracted from the PMT as well so that PIDs, etc.

of packets containing broadcast contents can be acquired. Accordingly, the relevant packets can be extracted from the transport stream.

Meanwhile, an object descriptor (OD) included in scene description information is acquired from the transport stream (operation S240), and a scene is constituted using a correlation between ES_ID included in the OD stream and the PIDs of the packets containing the broadcast contents (operation S250). Accordingly, information to constitute the scene is decoded and output.

As such, in order to provide broadcast content (for example, audio and video data) to the user, the broadcast terminal must sequentially acquire (e.g., check, search, identify, and/or extract) interpretation information (e.g. desired or predetermined information and/or data) to interpret (e.g., acquire, determine, check, search, identify, and/or extract, etc.) broadcast contents from a transport stream. Examples of interpretation information include the PAT, the PMT, the OD, and the like. That is, if a transport stream is received, the broadcast terminal checks the PAT, interprets the PAT, and then proceeds to the PMT search mode. If the PMT is checked, the broadcast terminal interprets the PMT and proceeds to the OD search mode. Then, the broadcast terminal interprets the OD. That is, the PAT, the PMT, and the OD may be sequentially interpreted.

However, packets of the transport stream distinguished (identified) by PIDs in the transport stream are not necessarily received in the order described above. For example, even when the broadcast terminal receives a PMT and an OD while the broadcast terminal is searching for a PAT, the broadcast terminal may still continue to search for the PAT and interpret the PAT before the broadcast terminal is able to provide the broadcast contents to the user. Thus, the broadcast terminal may not provide the relevant content to the user until the PAT, the PMT and the OD are sequentially received. As a result, the time (a broadcast standby time) required to provide the broadcast to the user through the broadcast channel increases. Accordingly, having to sequentially receive the PAT, the PMT, and the OD before being able to provide the broadcast content has disadvantages. A method to decrease the broadcast standby time will be discussed later.

Figure 3:
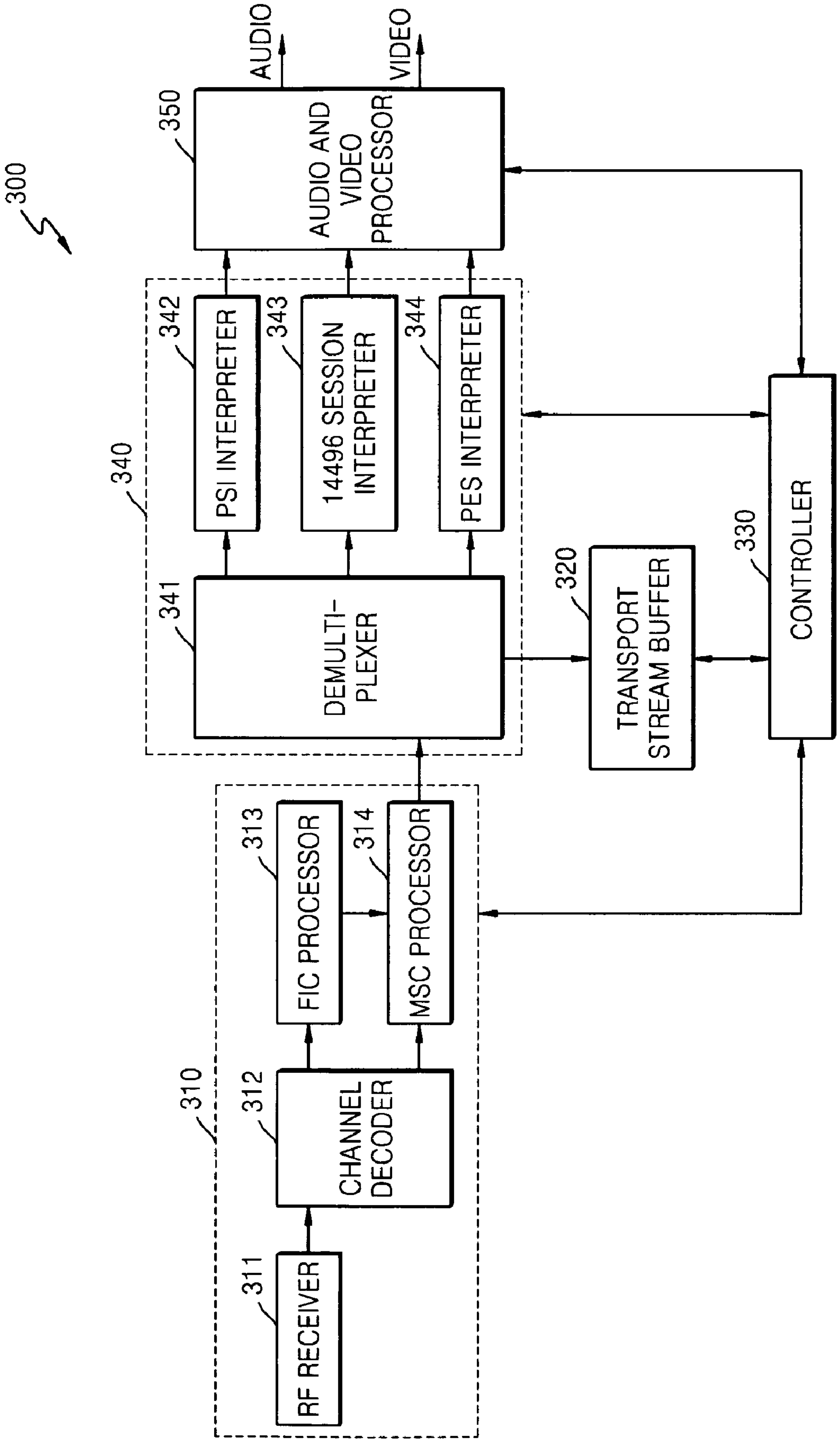
FIG. 3 is a block diagram of a digital broadcast receiving apparatus according to an aspect of the present invention.

FIG. 3 is a block diagram of a digital broadcast receiving apparatus 300 according to an aspect of the present invention. Referring to FIG. 3, the digital broadcast receiving apparatus 300 includes a transport stream generator 310, a transport stream buffer 320, a controller 330, a transport stream processor 340, and an audio and video processor 350.

The transport stream generator 310 receives a digital broadcast signal, and processes the received digital broadcast signal to generate a transport stream. The components of the transport stream generator 310 can vary to suitably process a digital broadcast signal encoded according to various digital broadcasting standards that may be used.

If one of the usable digital broadcasts is a digital multimedia broadcast, then the transport stream generator 310 can include an RF receiver 311, a channel decoder 312, an FIC processor 313, and an MSC processor 314. The RF receiver 311 receives a digital multimedia broadcasting RF signal, and the channel decoder 312 separates the received digital multimedia broadcasting RF signal into FIC data and MSC data.

The FIC processor 313 interprets multiplexing information and service information from the FIC data separated by the channel decoder 312. The MSC processor 314 extracts a transport stream containing MPEG-4-based audio and video from the MSC data separated by the channel decoder 312 using the multiplexing information and service information interpreted by the FIC processor 313.

The transport stream buffer 320 buffers the transport stream. The transport stream buffer 320 should have sufficient capacity to buffer a desired amount of the transport stream. In a non-limiting example, the transport stream buffer 320 has a capacity greater than a value obtained by adding a maximum value of the intervals at which a PAT is repeatedly received, a maximum value of the intervals at which a PMT is repeatedly received, and a maximum value of the intervals at which an OD is repeatedly received, and multiplying the added result by a data transmission rate of a broadcast service.

The transport stream that is buffered includes information to interpret broadcast content, information to constitute a scene using the broadcast content, etc. as well as the broadcast content, as described above. If the information to interpret the broadcast content, scene information to display the broadcast content, etc. (which are characteristics or types of the transport stream) are changed while the transport stream is being buffered, then the buffered transport stream cannot be reliable because using the buffered transport stream that does not correspond to the various information would cause errors. In other words, using a transport stream that started being buffered before the information was changed causes errors.

Accordingly, the controller 330 must determine whether the buffered transport stream is reliable. The controller 330 determines whether the buffered transport stream is reliable by checking whether the characteristic or type of transport stream has changed, as discussed below.

In more detail, the controller 330 can determine whether the buffered transport stream is reliable based on information indicating that a broadcast service has changed. Specifically, when a digital multimedia broadcast is processed and if information indicating that a broadcast service has changed is interpreted from a digital broadcast signal by the transport stream generator 310, and the information is transmitted to the controller 330, the controller 330 can determine whether the buffered transport stream is reliable.

In aspects of the present invention, the information indicating that the broadcasting service has changed may be an indicator with two bits. The indicator, which is included in an FIG 0/0 (Extension 0 of FIG type 0), is indicated by a change flag indicating whether a sub-channel configuration and/or a service configuration has changed. An example of the indicator with two bits is a structure of an Ensemble information field in which a change flag is included as shown in FIG. 5.

As shown in FIG. 5, if the change flag is 00, this state refers to a current state that has not changed. If the change flag is 01, this state refers to that only the sub-channel configuration has changed. If the change flag is 10, this state refers to that only the service configuration has changed. If the change flag is 11, this state refers to that both the sub-channel configuration and the service configuration have changed. The FIC processor 313 of the transport stream generator 310 interprets the FIG 0/0 and transfers the interpreted result to the controller 330.

In another aspect of the present invention, the controller 330 can determine whether the buffered transport stream is reliable based on indicators that are respectively included in the PAT, PMT, and OD of the transport stream. The indicators indicate whether the PAT, the PMT, and the OD can be currently used or must be used next time, as described below.

FIG. 4 illustrates an indicator included in a program association table (PAT) according to an aspect of the present invention. In the non-limiting example of FIG. 4, a current_next_indicator is a 1 bit indicator. When the indicator is set to '1', for example, this state refers to the fact that the transmitted PAT can be currently used. If the indicator is set to '0', this state refers to the fact that a currently transmitted table (PAT) cannot be used and the following (or subsequent) table (PAT) is valid and usable. Indicators having the same function as the indicator included in the PAT are also included in the PMT and/or OD. In other words, the PMT and/or the OD may also contain one or more indicators that indicate whether the PMT and/or the OD can be currently used with the buffered transport stream or must be used next time with another transport stream. Accordingly, any one of the PAT, the PMT, and the OD may be used to indicate that the buffered transport stream may or may not be reliable and/or usable according to any one of the above aspects of the present invention.

Once the buffered transport stream is determined as not reliable, the controller 330 controls the transport stream processor 340 so that the buffered transport stream cannot be used. Also, since it becomes unnecessary to continuously buffer the transport stream, the controller 330 also controls the transport stream buffer 320 so that the transport stream is no longer buffered.

On the other hand, once the buffered transport stream is determined as reliable (according to one or both of the above aspects of the present invention), the transport stream processor 340 searches for interpretation information to interpret the broadcast content from (or within) the buffered transport stream, and searches for the broadcast content based on the interpretation information. If the digital broadcast is a digital multimedia broadcast, the transport stream processor 340 may include a demultiplexer 341, a program specific information (PSI) interpreter 342, a 14496 session interpreter 343, and a PES interpreter 344, as shown in FIG. 3 to process the digital multimedia broadcast.

Referring to FIG. 3, the demultiplexer 341 demultiplexes the transport stream and separates the transport stream into a PSI packet, a 14496 session packet, and a PES packet. The PSI interpreter 342 receives and interprets the PSI packet from the demultiplexer 341, sequentially checks the PAT and the PMT, and generates IOD data.

The 14496 session interpreter 343 receives and interprets the 14496 session packet from the demultiplexer 341, and generates an MPEG-4-based OD or a Binary Format For Scene (BIFS) Sync Layer (SL) packet.

The PSI interpreter 342 transfers indicators to the controller 330. The respective indicators which are from the PAT and PMT indicate whether the PAT and PMT can be currently used or must be used next time. Also, the 14496 session interpreter 343 transfers an indicator to the controller 330. The indicator from the OD indicates whether the OD can be currently used or must be used next time. If the various indicators indicate that the PAT, PMT, and/or OD must be used next time, the controller 330 stops buffering the buffered transport stream, as described above.

The PES interpreter 344 receives and interprets the PES packet from the demultiplexer 341 and generates an MPEG-4-based audio/video sync layer (SL) packet.

The audio and video processor 350 receives the IOD data from the PSI interpreter 342, receives the MPEG-4-based OD packet or BIFS-SL packet from the 14496 session interpreter 343, and the MPEG-4-based audio/video SL packet from the PES interpreter 344, and decodes them according to the MPEG-4 standard to generate audio and video data of the digital broadcast.

In view of the above, the digital broadcast receiving apparatus according to aspects of the present invention buffers a transport stream even if the transport stream does not include interpretation information that is sequentially processed for each operation to access broadcasting content, and extracts the interpretation information from the buffered transport stream. Accordingly, it is possible to reduce the broadcast standby time.

In various aspects of the present invention, digital multimedia broadcasting is described as an example. However, the digital broadcast receiving apparatus according to aspects of the present invention can be implemented according to other digital broadcasting standards, such as the Digital Video Broadcast Terrestrial (DVB-T) standard or the Handheld Digital Video Broadcasting (DVB-H) standard.

Figure 6:
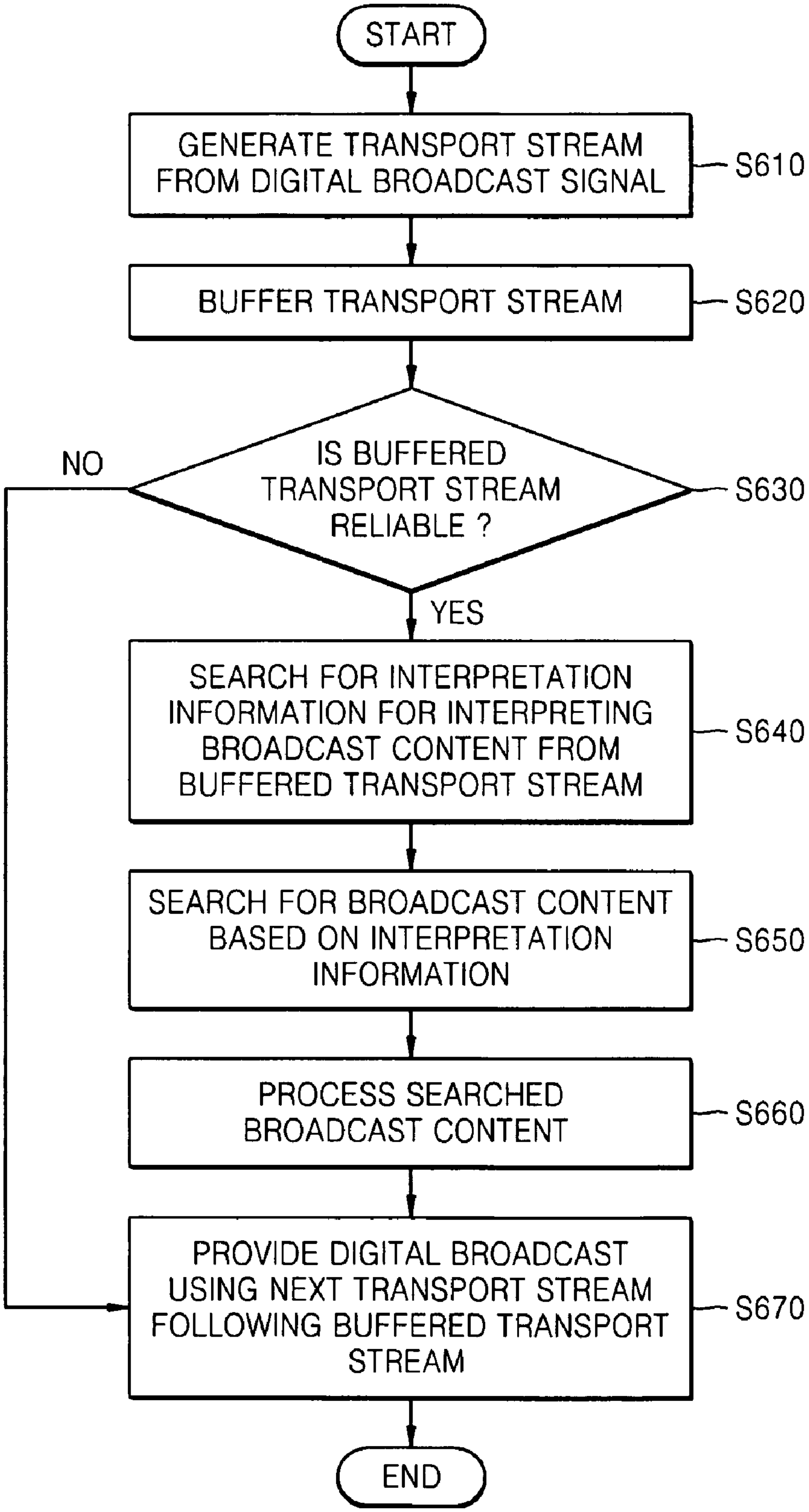
FIG. 6 is a flowchart illustrating a method of receiving a digital broadcast according to an aspect of the present invention.

FIG. 6 is a flowchart illustrating a method of receiving a digital broadcast according to an aspect of the present invention. Referring to FIG. 6, in operation S610, a transport stream is generated from a received digital broadcast signal. Then, in operation S620, the transport stream is buffered.

In operation S630, it is determined whether the buffered transport stream is reliable. The determination of whether the buffered transport stream is reliable can depend on whether the characteristic of the transport stream has changed.

In operation S630, if it is determined that the buffered transport stream is reliable (Yes in S630), the interpretation information to interpret the broadcast content is searched from the buffered transport stream in operation S640.

In operation S650, the broadcast content is searched based on the interpretation information. Then, in operation S660, the searched broadcast content is decoded and output (i.e., processed).

On the other hand, in operation S630, if the buffered transport stream is determined as not reliable (no in S630), then the digital broadcast is provided using the next (or subsequent) transport stream that follows the buffered transport stream, in operation S670. That is, in operation S670, in the processing of the digital broadcast, no transport stream is buffered. Then, interpretation information to interpret the broadcast content is extracted from the next transport stream, the broadcast content is searched according to the interpretation information, and the broadcast content is processed.

Figure 7:
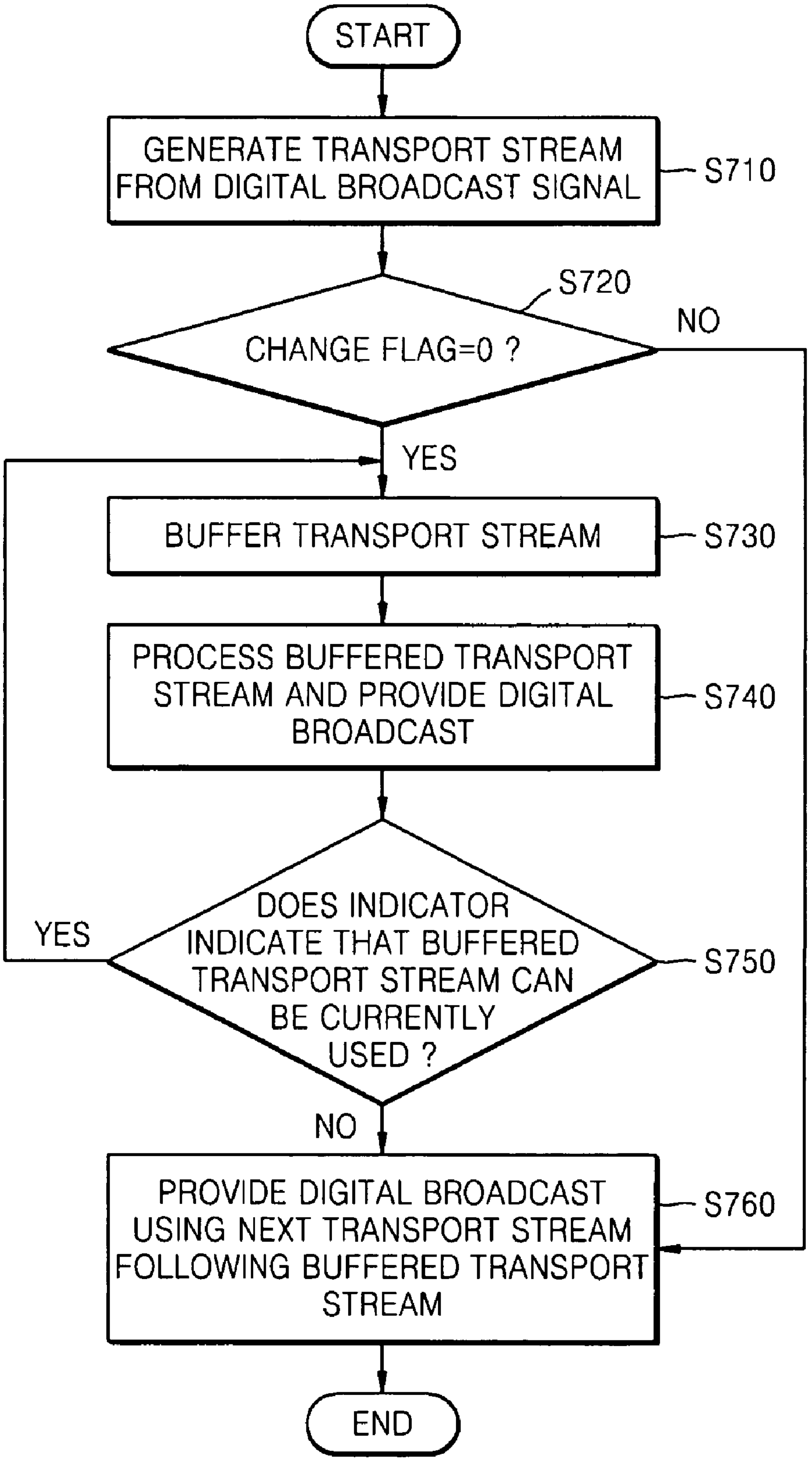
FIG. 7 is a flowchart illustrating a method of receiving a digital broadcast according to another aspect of the present invention.

FIG. 7 is a flowchart illustrating a method of receiving a digital broadcast according to another aspect of the present invention. Referring to FIG. 7, in operation S710, a transport stream is generated from a received digital broadcast signal.

In operation S720, a determination is made as to whether a change flag that indicates whether a subchannel configuration and/or a service configuration included in FIG. 0/0 (Extension 0 of FIG type 0) changes is 0. If the change flag is 0, neither a subchannel configuration nor a service configuration has changed. Accordingly, in operation S730, the transport stream is buffered.

In operation S740, interpretation information to interpret the broadcast content is extracted from the buffered transport stream, the broadcast content is searched based on the interpreted information, the transport stream is processed, and the broadcast content in the processed transport stream is decoded. Accordingly, the digital broadcast is provided.

In operation S750, based on indicators that are respectively included in the PAT, the PMT, and the OD of the transport stream to indicate whether the PAT, the PMT, and the OD can be currently used or must be used next time, a determination is made as to whether the transport stream can be currently used. If the indicators indicate that the transport stream can be currently used, the digital broadcast is provided using the buffered transport stream.

That is, according to this aspect of the present invention, it is possible to check whether a buffered transport stream is reliable during the respective or various stages of the method. If the change flag is not 0 during operation S720 or if the indicators respectively included in the PAT, PMT, and OD indicate that the PAT, the PMT, and/or the OD must be used next time, the buffered transport stream is determined as not reliable.

In operation S760, the digital broadcast is provided using the next received transport stream that follows the buffered transport stream. Also, if the buffered transport stream is determined as not reliable, the transport stream is no longer buffered.

Figure 8A:
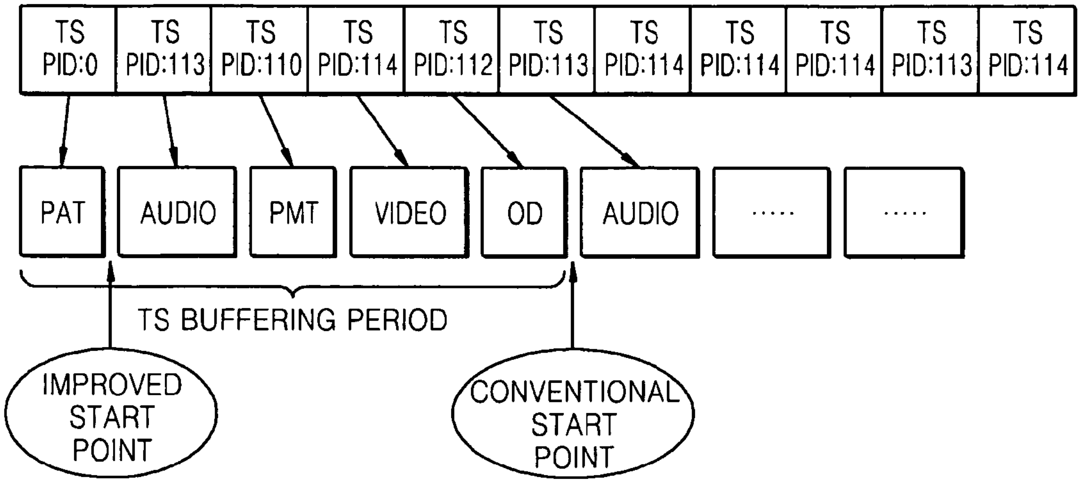
FIGS. 8A and 8B are respective views of overlaid start points of audio and video streams when a conventional method of receiving a digital broadcast is used, and overlaid start points of audio and video streams when the methods of receiving digital broadcasts according to aspects of the present invention are used.
Figure 8B:
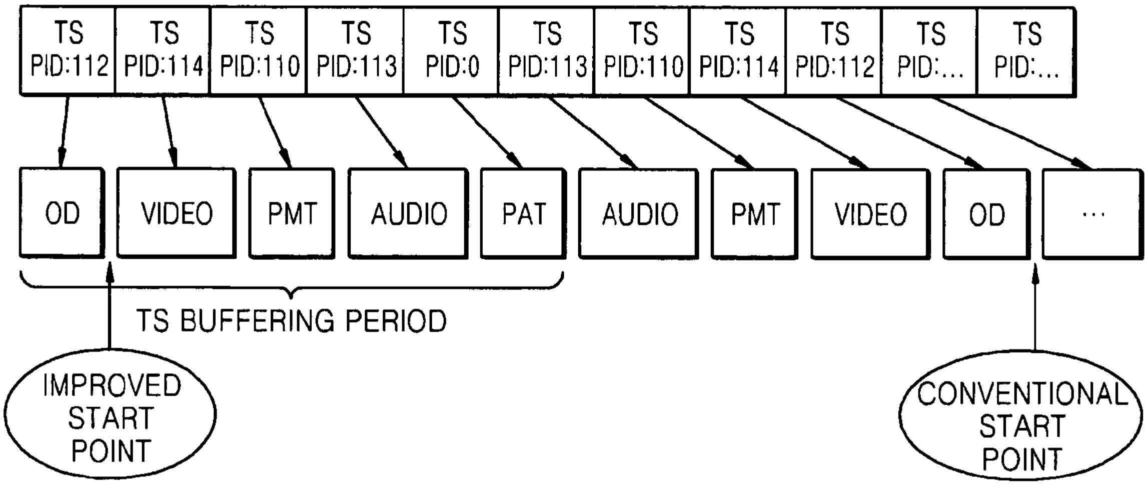

FIGS. 8A and 8B are respective views of overlaid start points of audio and video streams when the conventional method of receiving a digital broadcast is used, and overlaid start points of audio and video streams when methods of receiving digital broadcast according to aspects of the present invention are used.

FIG. 8A illustrates a case when the PAT, the PMT, and the OD are coincidentally received in an ideal order, and FIG. 8B illustrates a general case when the PAT, the PMT, and the OD are randomly received in a random order. FIG. 8A is first described below.

As shown in FIG. 8A, the PAT, the PMT, and the OD are coincidentally received in an ideal order. As shown, the starting point of the conventional method is an audio stream that follows the receipt and check of the PAT, PMT, and OD. However, according to this aspect of the present invention, the start point is the audio stream that is included in a buffered transport stream, and which is received before all of the PAT, PMT, and OD, namely, after only the PAT is checked.

Referring to FIG. 8B, the conventional method of receiving a digital broadcast requires one to wait until the PAT, the PMT, and the OD are all sequentially received and interpreted, in order to output audio and video streams. As shown in FIG. 8B, the start point of an audio/video stream according to the conventional method, is significantly different from the start point of an audio/video stream according to this aspect of the present invention. In other words, in this aspect, the start point of an audio/video stream occurs right after the OD is checked. Also, a buffering time of audio and video frames required by an encoder is generally similar to a buffering period of a transport stream.

In FIG. 8B, while the conventional art method waits to receive the PMT after receiving the PAT, the method according to this aspect of the present invention begins to decode and output the audio and video as soon as an indicator is checked, such an indicator from one of the PAT, PMT, and/or OD.

In view of the above, when a channel is first tuned or when a channel conversion (or change) is performed, a waiting time of about 1 second is required in the conventional method. However, a waiting time may be shortened to only 0.5 second or less in the aspects of the present invention. Also, when a user continuously changes channels to search for desired broadcast channels, the waiting time can be considerably shortened by several seconds or more as compared to that of the conventional method.

The invention can also be embodied as computer readable codes on a computer readable recording medium. The code segments to implement the program can be easily induced by computer programmers skilled in the art to which aspects of the present invention pertains. The computer readable recording medium is any data storage device that can store data that can be thereafter read by a computer system to execute the codes. Examples of the computer readable recording medium include read-only memory (ROM), random-access memory (RAM), CD-ROMs, magnetic tapes, floppy disks, optical data storage devices, and a computer data signal or code embodied in a carrier wave or carrier waves (such as data transmission through the Internet). The computer readable recording medium can also be distributed over network coupled computer systems so that the computer readable code is stored and executed in a distributed fashion.

As described above, in a digital broadcast receiving apparatus and method according to aspects of the present invention, interpretation information (which must be sequentially checked and used to interpret broadcast content) and the broadcast content, can be searched from a buffered transport stream. Accordingly, it is possible to quickly output and provide digital broadcast content to a user.

Also, by determining whether a buffered transport stream is reliable, the digital broadcast receiving apparatus according to aspects of the present invention can selectively use the method of receiving a digital broadcast according to the present invention or the conventional method of receiving a digital broadcast.

In various aspects, the digital broadcast receiving apparatus may be a PDA, a cell phone, a portable computer, or any device able to receive a DMB, or the like.

Although a few aspects of the present invention have been shown and described, it would be appreciated by those skilled in the art that changes may be made in aspects without departing from the principles and spirit of the invention, the scope of which is defined in the claims and their equivalents.

What is claimed is:

1. A digital broadcast receiving apparatus comprising:

a transport stream generator to generate a transport stream from a digital broadcast signal;

a transport stream buffer to buffer the transport stream;

a controller to determine whether the buffered transport stream is reliable;

a transport stream processor to search for interpretation information for interpreting broadcast content from the buffered transport stream, and to search for the broadcast content based on the interpretation information, if the buffered transport stream is determined as reliable; and an audio and video processor to process the searched broadcast content, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

2. The digital broadcast receiving apparatus of claim 1, wherein the controller determines whether the buffered transport stream is reliable according to whether a characteristic of the transport stream has changed.

3. The digital broadcast receiving apparatus of claim 1, wherein the interpretation information for interpreting the broadcast content includes a the PAT, the PMT, and/or the OD.

4. The digital broadcast receiving apparatus of claim 1, wherein the controller determines whether the buffered transport stream is reliable based on information indicating whether a broadcast service has changed.

5. The digital broadcast receiving apparatus of claim 4, wherein, the transport stream generator interprets the information indicating whether the broadcast service has changed from the digital broadcasting signal and transfers the interpreted information to the controller, and the information indicating whether the broadcast service has changed is a change flag included in an FIG 0/0 (Extension 0 of FIG type 0) and which indicates whether a subchannel configuration and/or service configuration has changed.

6. The digital broadcast receiving apparatus of claim 1, wherein the transport stream processor interprets indicators respectively included in the PAT, the PMT, and/or the OD that indicate whether the PAT, the PMT, and/or the OD can be currently used or must be used next time, respectively, and transfers the interpreted result to the controller, and the controller determines whether the buffered transport stream is reliable based on the interpreted result.

7. The digital broadcast receiving apparatus of claim 1, wherein, if the buffered transport stream is determined as not reliable, the controller controls the transport stream processor so that the buffered transport stream is not used.

8. The digital broadcast receiving apparatus of claim 1, wherein, if the buffered transport stream is determined as not reliable, the controller controls the transport stream buffer so that the transport stream is no longer buffered.

9. A method of receiving a digital broadcast, the method comprising:

generating a transport stream from a digital broadcast signal;

buffering the transport stream in a transport stream buffer;

determining whether the buffered transport stream is reliable;

searching for interpretation information for interpreting broadcast content from the buffered transport stream if the buffered transport stream is determined as reliable;

searching for the broadcast content based on the interpretation information; and processing the searched broadcast content, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

10. The method of claim 9, wherein the determining of whether the buffered transport stream is reliable depends on whether a characteristic of transport stream has changed.

11. The method of claim 9, wherein the interpretation information includes the PAT, the PMT, and/or the OD.

12. The method of claim 9, wherein the determining of whether the buffered transport stream is reliable depends on information indicating whether a broadcast service has changed.

13. The method of claim 12, wherein, the information indicating whether the broadcast service has changed is indicated through a change flag included in a FIG 0/0 (Extension 0 of FIG type 0) and which indicates whether a subchannel configuration and/or service configuration has changed.

14. The method of claim 9, wherein the determining of whether the buffered transport stream is reliable depends on indicators respectively included in the PAT, the PMT, and/or the OD that indicates whether the PAT, the PMT, and/or the OD can be currently used or must be used next time, respectively.

15. The method of claim 9, wherein, if the buffered transport stream is determined as not reliable, the digital broadcast is provided using a next transport stream that follows the buffered transport stream.

16. The method of claim 9, further comprising, if the buffered transport stream is determined as not reliable, the buffering of the transport stream is stopped.

17. A computer readable recording medium having embodied thereon a computer program for a computer to implement the method of claim 9.

18. A method of generating digital multimedia data from a digital broadcast signal, comprising:

buffering, in a transport stream buffer, a transport stream generated from the digital broadcast signal;

detecting an indicator that indicates whether the digital multimedia data may be output using the transport stream during the buffering of the transport stream; and outputting the digital multimedia data during the buffering of the transport stream based on the detected indicator, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

19. The method of claim 18, wherein the indicator is included in at least one of a program association table, a program map table, and an object descriptor.

20. The method of claim 18, wherein the indicator is included in a FIG 0/0 which indicates whether a subchannel configuration and/or a service configuration has changed.

21. The method of claim 18, wherein the digital multimedia data are audio and video streams.

22. The method of claim 18, wherein the outputting of the digital multimedia data is stopped if the indicator indicates that the digital multimedia data may not be output.

23. A computer readable recording medium having embodied thereon a computer program for a computer to implement the method of claim 18.

24. A digital broadcast receiving apparatus to generate digital multimedia data from a digital broadcast signal, comprising:

a transport stream buffer to buffer a transport stream generated from the digital broadcast signal;

a controller to detect an indicator that indicates whether the digital multimedia data may be output using the transport stream during the buffering of the transport stream; and a digital multimedia data processor to output the digital multimedia data during the buffering of the transport stream based on the detected result, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

25. The digital broadcast receiving apparatus of claim 24, wherein the indicator is included in at least one of a program association table, a program map table, and an object descriptor.

26. The digital broadcast receiving apparatus of claim 24, wherein the indicator is included in a FIG 0/0 which indicates whether a subchannel configuration and/or a service configuration has changed.

27. The digital broadcast receiving apparatus of claim 24, wherein the digital multimedia data is audio and video streams.

28. The digital broadcast receiving apparatus of claim 24, wherein the digital multimedia data processor stops outputting the digital multimedia data if the controller detects the indicator that indicates that the digital multimedia data may not be output.

29. A method of generating digital multimedia data from a digital broadcast signal using a plurality of predetermined information, comprising:

generating a transport stream from the digital broadcast signal, wherein the transport stream contains the plurality of predetermined information;

buffering the transport stream in a transport stream buffer;

detecting at least one of the plurality of predetermined information from the buffered transport stream and extracting an indicator from the one predetermined information; and outputting the digital multimedia data if the detected indicator indicates that the digital multimedia data may be output prior to detecting the other of the plurality of predetermined information, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

30. The method of claim 29, wherein the plurality of predetermined information includes the PAT, the PMT, and/or the OD.

31. The method of claim 29, wherein the digital multimedia data are audio and video streams.

32. The method of claim 29, wherein the outputting of the digital multimedia data is stopped if the indicator indicates that the digital multimedia data may not be output.

33. A digital broadcast receiving apparatus to generate digital multimedia data from a digital broadcast signal, comprising:

a transport stream generator to generate a transport stream from the digital broadcast signal, wherein the transport stream contains the plurality of predetermined information;

a transport stream buffer to buffer the transport stream;

a transport stream processor to detect at least one of the plurality of predetermined information from the buffered transport stream and to extract an indicator from the one predetermined information; and a digital multimedia data processor to output the digital multimedia data prior to the detection of the other of the plurality of predetermined information by the transport stream processor if the detected indicator indicates that the digital multimedia data may be output, wherein the transport stream buffer has a capacity greater than a value obtained by adding a maximum value of the intervals for which a Program Association Table (PAT) is repeatedly received, a maximum value of the intervals for which a Program Map Table (PMT) is repeatedly received, and a maximum value of the intervals for which an Object Descriptor (OD) is repeatedly received, and multiplying the added result by a data transmission rate of a broadcast service.

34. The digital broadcast receiving apparatus of claim 33, wherein the plurality of predetermined information includes the PAT, the PMT, and/or the OD.

35. The digital broadcast receiving apparatus of claim 33, wherein the digital multimedia data are audio and video streams.

36. The digital broadcast receiving apparatus of claim 33, wherein the outputting of the digital multimedia data by the digital multimedia data processor is stopped if the detected indicator indicates that the digital multimedia data may not be output.

* * * * *

UNITED STATES PATENT AND TRADEMARK OFFICE

CERTIFICATE OF CORRECTION

PATENT NO. : 7,760,764 B2
APPLICATION NO. : 11/604861
DATED : July 20, 2010

INVENTOR(S) : Young-joon Ahn et al.

It is certified that error appears in the above-identified patent and that said Letters Patent is hereby corrected as shown below:

Column 10, Line 52 delete “a the” and insert -- the --, therefor.

Column 11, Line 42 after “of” insert -- the --.

Signed and Sealed this

Twenty-first Day of December, 2010

David J. Kappos
*Director of the United States Patent and Trademark Office*